US010875372B2

(12) United States Patent
Beylin et al.

(10) Patent No.: US 10,875,372 B2
(45) Date of Patent: Dec. 29, 2020

(54) "AFW-4" VEHICLE SUSPENSION (71) Applicants: Georgiy Volodymyrovych Beylin, Kiev (UA); Sergiy Yuriiovich Petrenko, Kiev (UA)

(72) Inventors: Georgiy Volodymyrovych Beylin, Kiev (UA); Sergiy Yuriiovich Petrenko, Kiev (UA)

(*) Notice: Subject to any disclaimer, the term of this patent is extended or adjusted under 35 U.S.C. 154(b) by 60 days.

(21) Appl. No.: 16/322,341

(22) PCT Filed: Aug. 17, 2016

(86) PCT No.: PCT/UA2016/000100
§ 371 (c)(1),
(2) Date: Jan. 31, 2019

(87) PCT Pub. No.: WO2018/034632
PCT Pub. Date: Feb. 22, 2018

(65) Prior Publication Data
US 2019/0193503 A1 Jun. 27, 2019

(51) Int. Cl.
*B60G 3/20* (2006.01)
*B60G 21/05* (2006.01)
(Continued)

(52) U.S. Cl.
CPC ............... *B60G 3/20* (2013.01); *B60G 11/00* (2013.01); *B60G 17/02* (2013.01); *B60G 21/045* (2013.01);
(Continued)

(58) Field of Classification Search
CPC ........ B60G 3/20; B60G 17/02; B60G 21/045; B60G 11/00; B60G 21/05;
(Continued)

(56) References Cited

U.S. PATENT DOCUMENTS 3,909,022 A * 9/1975 Claxton ................. A01D 46/00
280/6.155
3,964,563 A 6/1976 Allen
(Continued)

FOREIGN PATENT DOCUMENTS

FR 2861017 A1 4/2005
SU 1202907 A 1/1986

*Primary Examiner* — Ruth Ilan
*Assistant Examiner* — Hilary L Johns
(74) *Attorney, Agent, or Firm* — DeLio Peterson & Curcio; Thomas E. Ciesco (57) ABSTRACT

The invention relates to suspension design. The present vehicle suspension comprises a quadrangular frame. Each corner portion of the frame has a wheel block kinematically attached thereto so as to form two pairs of wheels—a front pair and a rear pair. On each side of the frame, longitudinal and transverse coupling cables are fastened for movement therealong inside housings. Each wheel block consists of a body that is simultaneously connected to two coupling cables. Movably mounted on the body are parallel horizontal arms, the first of which is fastened to the body by its middle portion. A knuckle with the hub of a wheel is attached to an end of the first arm and to another end of the second arm, and two coupling cable dampers are attached to the other end of the first arm. The housings of the cables are attached to the body of the corresponding wheel block. The free end of each cable is enclosed in a damper. Mounted on the cable end portions that freely project from the housings in front of a damper are spring stabilizers of the position of the wheel of the wheel block. Each coupling cable is provided with a linear actuator. The result is an increase in the stability and smoothness of movement of a vehicle.

2 Claims, 6 Drawing Sheets

(51) Int. Cl.
*B60G 11/00* (2006.01)
*B60G 21/045* (2006.01)
*B60G 17/02* (2006.01)
*A61G 5/10* (2006.01)

(52) U.S. Cl.
CPC ............ *B60G 21/05* (2013.01); *A61G 5/1078* (2016.11); *B60G 2200/144* (2013.01); *B60G 2204/83022* (2013.01); *B60G 2300/24* (2013.01); *B62B 2301/20* (2013.01)

(58) Field of Classification Search
CPC .......... B60G 2200/144; B60G 2300/24; A61G 5/1078; B62B 2301/20
USPC .................................. 280/6.15, 6.154, 6.155
See application file for complete search history.

(56) References Cited

U.S. PATENT DOCUMENTS

| | | | | |
|---|---|---|---|---|
| 4,277,085 A | * | 7/1981 | Bryansky | B60G 11/006 280/104 |
| 5,230,529 A | * | 7/1993 | Harvey-Bailey | B60G 17/0162 280/5.508 |
| 5,382,034 A | * | 1/1995 | Parker | B60G 21/005 280/104 |
| 5,542,705 A | * | 8/1996 | Parker | B60G 21/026 280/124.103 |
| 2015/0290994 A1 | * | 10/2015 | Dames | B60G 7/001 280/830 |

* cited by examiner

"AFW-4" VEHICLE SUSPENSION

BACKGROUND OF THE INVENTION

1. Field of the Invention

The present invention relates to structural components of vehicles, and more specifically to suspension of both usual cars and special small size vehicles, in particular, baby buggies, wheelchairs, carts for patients or, for example, carts for transporting materials at construction sites or products in retail stores.

2. Description of Related Art

AFW is an abbreviation of the slogan: "always on four wheels".

Clearance or road clearance is the distance from the ground to the lowest point in the central part of a terrestrial vehicle. Under certain road speed and roadway condition, a motor vehicle steerability depends on the clearance value.

The suspension or spring system of a vehicle is a combination of parts, assemblies and mechanisms that play the role of a connecting link between the body of a vehicle, in particular, a baby buggy or a wheelchair and the road.

In terms of a number of the essential features, the closest analogue of the present invention is a vehicle suspension comprising a quadrangular frame with a wheel block kinematically attached to each corner section thereof, thus forming two pairs of wheels—front and rear ones [Utility Model Patent No. 108091, Ukraine, IPC (2016.01) B60G 17/0165 (2006.01); B60G 21/05 (2006.01); B60G 11/00. Published on 24 Jun. 2016, bul. #12]. The kinematic scheme of the disclosed suspension comprises rigid arms and torsion bars.

SUMMARY OF THE INVENTION

The described suspension ensures constant uniform distribution of the vehicle weight among all four wheels, thus attaining constant coefficient of traction for all wheels regardless of the roadway curvature, has adjustable ground clearance, allows body tilting when driving along the slope, during cornering and also to allow passengers to exit from the vehicle. Additionally, the disclosed suspension may be equipped with wheel arms of increased length for improved off-road performance without changing the length of the wheelbase.

However, when passing over an obstacle, for example, when rolling on or off a street curb only on a pair of rear or front wheels, a wheelchair or a baby buggy made on the basis of the described suspension is unstable due to free attachment of the arms in the disclosed suspension. This significantly complicates the steering.

In addition, it is difficult to create, for example, assemblable and disassemblable or collapsible cart for transporting goods in retail stores, based on the suspension with rigid arms and torsion bars, therefore, in the initial state such carts occupy large areas in commercial premises, which limits their use for the above purposes.

Therefore, the present invention is aimed to provide such a suspension of a ground vehicle that would provide increased stability and smoothness of movement not only of ground vehicles, such as cars, but also of wheelchairs, baby buggies, when passing over obstacles, for example, when rolling on or off street curb only on one pair of rear or front wheels.

In the proposed suspension the aim is attained by creating conditions for synchronous change of the longitudinal and transverse coupling cables lengths in the process of vehicle movement by way of using linear actuators for synchronous change of the relative position of coupling cables housings and bodies of corresponding wheel blocks in the structure.

Similar to a vehicle suspension of the prior art, the suspension of the present invention comprises a quadrangular frame with a wheel block kinematically attached to each corner section thereof, thus forming two pairs of wheels front and rear ones, while according to the invention longitudinal and transverse coupling cables in housings, respectively, are attached to the sides of the frame so that they can move along the sides of the frame, each wheel block consists of a body connected with two coupling cables simultaneously, parallel horizontal arms are movably mounted on said body, the first arm is attached to the body with its middle part, a knuckle with a wheel hub is attached to one end of the first arm and other end of the second arm, two coupling cable dampers are attached to another end of the first arm, coupling cable housings are attached on the body of the corresponding wheel block, a free end of each cable is fixed in a damper, spring stabilizers of wheel position are put on end sections of cables protruding from the housings in front of the damper, and each coupling cable has a linear actuator, the casing of said linear actuator being rigidly attached to the body of the wheel block so that to allow changes in the relative position of the coupling cables housings and the body.

The feature of the proposed suspension is that it is supplemented with a U-shaped vertical frame, where its free ends are rigidly attached to the bodies of one pair of wheel blocks, while the U-shaped frame is pivotally connected to a handrail, kinematically coupled with blockers preventing wheel block arms movement.

The proposed suspension possesses all the positive qualities of the prototype and is free of the above disadvantages. The suspension ensures constant uniform distribution of the vehicle weight among all four wheels, while keeping constant the coefficient of traction for all wheels, regardless of the roadway curvature. It also has adjustable ground clearance. In addition, it can maintain a horizontal or close to horizontal position of the vehicle body when the vehicle is moving along a slope, cornering or remaining stationary to allow passengers to leave the vehicle. The proposed suspension may be equipped with wheel arms of increased length for improved off-road performance without changing the length of the wheelbase. There are four possible options for the mutual orientation of the arms, which are suitable for various purposes. It may be used to manufacture lightweight vehicles with variable distance between the wheels.

At the time of patent information research performed in the process of the present application preparation the authors have not revealed any vehicle suspensions possessing the above mentioned set of essential features, which proves that the claimed technical solution complies with "novelty" patentability criterion.

The technical result of the implementation of the present invention is providing a suspension that maintains stability when one pair of wheels gets off the road while passing over obstacles during movement, namely, providing suspensions for ground vehicles such as wheelchairs and baby buggies. The aim is attained by creating conditions for synchronous change of the longitudinal and transverse coupling cables lengths by way of using linear actuators in the suspension structure, such linear actuators being installed on each coupling cable and intended for a synchronous change of the relative position of coupling cables housings and bodies of corresponding wheel blocks.

The authors have not revealed the indicated technical result in the known technical solutions of the prior art, therefore the proposed suspension may be deemed to comply with the "inventive step" patentability criterion.

The proposed vehicle suspension consists of structural elements, which may be manufactured using presently known technological methods, means and materials. It may be used in ground vehicles in different sectors of economy, therefore it is possible to conclude that the proposed solution complies with "industrial applicability" patentability criterion.

The suspension consists of four identical wheel blocks and four coupling cables with linear actuators. The wheel blocks are attached to the corner zones of a flat quadrangular frame, and in top view their arm mechanisms are connected by coupling cables along the full circle. In the initial state the arms of the wheel blocks are located horizontally, in a plane parallel to the roadway, and are oriented as follows: front left and right ones are oriented forwards (relative to the direction of movement), rear right and left ones are oriented backwards, or front left and right ones are oriented backwards (relative to the direction of movement), rear right and left ones are oriented backwards, or front left and right ones are oriented backwards (relative to the direction of movement), rear right and left ones are oriented forwards, front right and left ones and also rear right and left ones are oriented perpendicular to the direction of movement. Thus, the right and left wheels of the front (rear) axle are located on the same axis. Coupling cables connect the wheel blocks for synchronous rotation of the wheel arms. The coupling cables may have either constant or variable length, i.e. they may be equipped with a linear actuator with a motorized drive, e.g. http://ru.aliexpress.com/item/Electric-Linear-Actuator-12v-DC-Motor-50mm-Stroke-Linear-Motion-Controller-12 mm-s-1000N-Heavy-Duty/
32691597311.html?spm=2114.41010208.4.209.upB7Zo
http://ru.aliexpress.com/item/Electric-Linear-Actuator-12v-DC-Motor-50 mm-Stroke-Linear-Motion-Controller-12 mm-s-1000N-Heavy-Duty/
32691597311.html?spm=2114.41010208.4.209.upB7Zo).
There are spring or polymer damper and also a spring wheel position stabilizer at the ends of each coupling cable. When the vehicle is in the horizontal position, changing the length of the coupling cable relative to the original length allows it to tilt the vehicle's frame to the right or left relative to the direction of movement in order to compensate for the slope of the road, to allow passengers to leave the vehicle or to pass a turn. The length of the coupling cables may be adjusted according to acceleration and tilt sensors signals using an on-board computer, or may be selected according to pre-programmed values using a switch connected to the linear actuator drive.

Wheel arms of one axle have a mechanical connection. The arms of each wheel block are connected to two adjacent (along full circle) wheel blocks with coupling cables to change the direction of rotation. Thus, upward rotation of the arm of one wheel block causes the arms of two adjacent wheel blocks to rotate downwards and vice versa.

The proposed vehicle suspension may change ground clearance and tilt forward, backward, right and left. For this purpose, a linear actuator is installed on each coupling cable. The linear actuator is installed in such a manner to allow the distance between the arm of the wheel block and the end section of the coupling cable housing to be changed. Synchronous and identical movement of linear actuators changes the spatial position of the suspension. Meanwhile, the length of the longitudinal and transverse coupling cables changes proportionally and synchronously, which allows to keep the original (initial) suspension setting.

In the proposed vehicle suspension, the steering mechanism and method of connecting the transmission with driving wheels is conventional and practically does not differ from currently used ones. In the suspension, shock absorbers may be installed for each wheel.

BRIEF DESCRIPTION OF THE DRAWINGS

The essence of the invention is further explained by the drawings, where.

DESCRIPTION OF THE EMBODIMENT(S)

In describing the embodiment of the present invention, reference will be made herein to FIGS. 1-12 of the drawings in which like numerals refer to like features of the invention.

The proposed "AFW-4" vehicle suspension (FIGS. 1, 2, 3) comprises a quadrangular frame (not shown) with a wheel block 1 kinematically attached to each corner section thereof, thus forming two pairs of wheels front and rear ones. The suspension also comprises longitudinal 2 and transverse coupling cables 3. TRW Aftermarket cables of parking brake and clutch [see website haps://www.trwaftermarket.com/ru/1/Drum-Brake-Actuation-Systems/Hand-brake-Clutch-Cables/] may be used as coupling cables 2 and 3. Each wheel block 1 consists of a body 4 with parallel arms 5 and 6 movably mounted thereon. The arm 5 is attached to the body 4 with its middle part.

A knuckle with a wheel 8 hub 7 is attached to one end of the arm 5 and the other end of the arm 6. Two coupling cable 2 and 3 dampers 9 are attached to another end of the arm 5. Coupling cable 2 and 3 housings are attached on the body 4 of the wheel block 1, and a free end of each cable is fixed in the corresponding damper 9. Spring stabilizers 10 of wheel position are put on end sections of cables 2 and 3 protruding from the housings on top of the damper 9. To allow forced repositioning of the vehicle frame (not shown), linear actuators 11 with motorized drives (not shown) are installed, so that one actuator is present on each of the coupling cables 2 and 3, and said linear actuators connect the free ends of each of the cables 2 and 3. Meanwhile, the linear actuator 11 casing is rigidly attached to the body 4 of the corresponding wheel block 1 in a such a manner to allow changes in the relative position of the coupling cables 2 and 3 housings and the body 4. To ensure the suspension stability when passing over obstacles on two (rear) wheels (FIG. 7), the suspension design is supplemented with a U-shaped vertical frame 12, where its free ends are rigidly attached to the bodies 4 of one pair of wheel blocks 1. U-shaped frame 12 is pivotally connected to a handrail 13. The handrail 13 is connected by rods 14 with blockers 15 preventing movement of the arms 5 and 6 of the wheel blocks 1.

The proposed suspension may be equipped with a control system, which is adapted to change the length of coupling cables 2, 3 and contains an on-board computer, acceleration and frame tilt sensors (not shown) with their outputs connected to the corresponding computer inputs, and the corresponding outputs of the onboard computer being connected to drives of linear actuators 11, which connect the free ends of each coupling cable 2 and 3.

The proposed structure is a multiarm suspension designed to ensure even distribution of vehicle weight among all four wheels 8 during its movement, to provide a constant value of the coefficient of traction for all wheels 8, which does not depend on the curvature of the roadway, and the suspension has an adjustable ground clearance. The suspension can enable the vehicle body to tilt during its movement along the slope, at turns and at the time of passengers' exit.

The vehicle suspension of the invention can be supplemented by a conventional steering mechanism (not shown).

Figure 1:
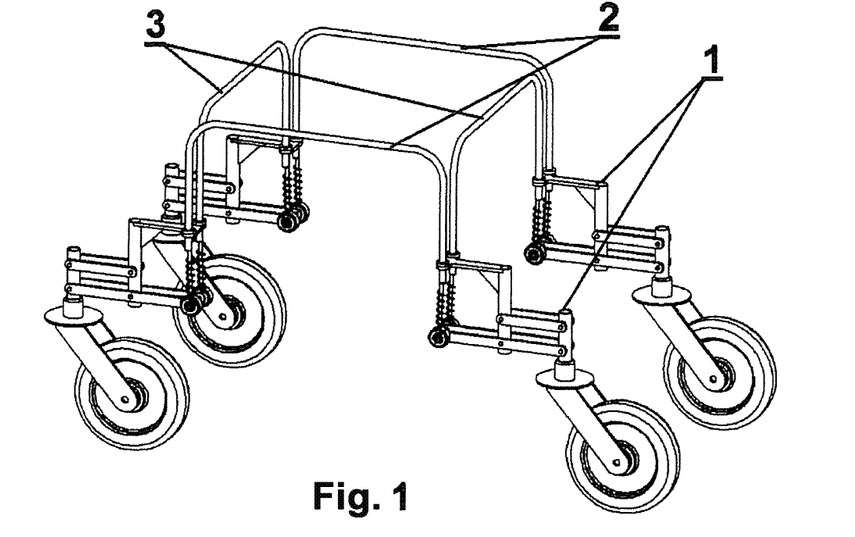
FIG. 1 is a general view of the "AFW-4" suspension.
Figure 2:
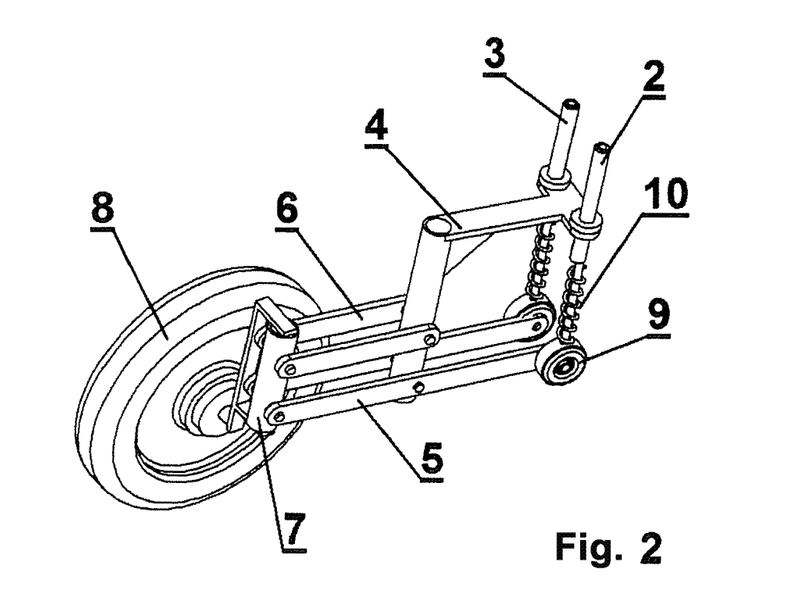
FIG. 2 shows a wheel block.
Figure 3:
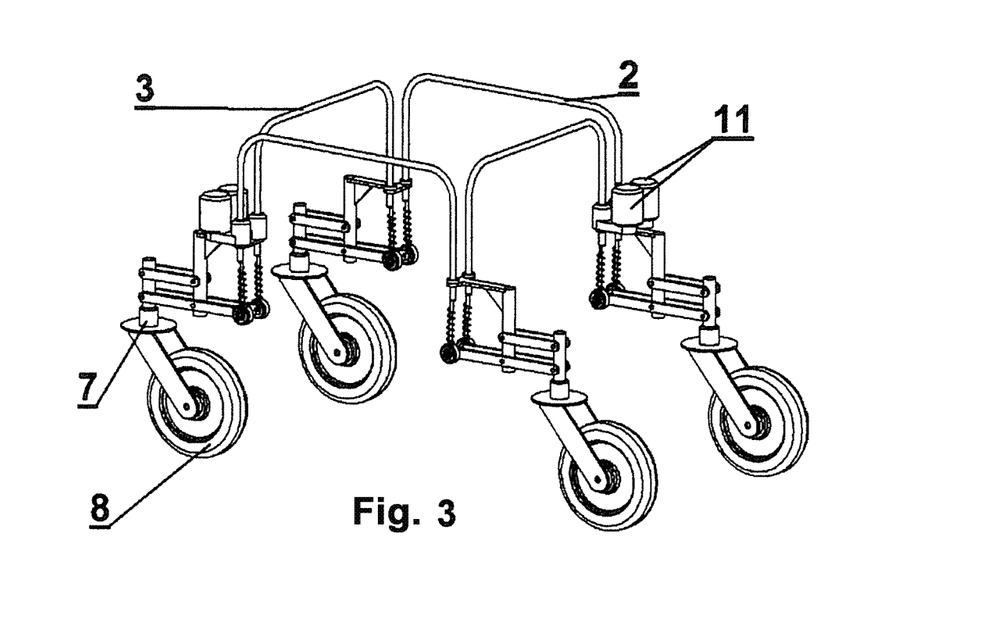
FIG. 3 illustrates the suspension with linear actuators.
Figure 4:
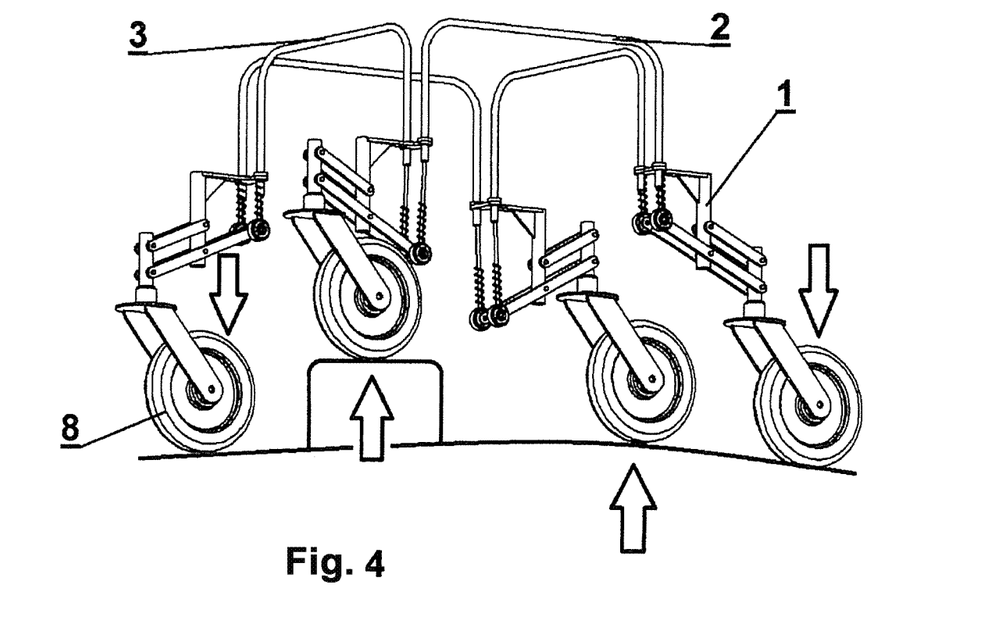
FIG. 4 schematically shows the process when one wheel passes over an obstacle.
Figure 5:
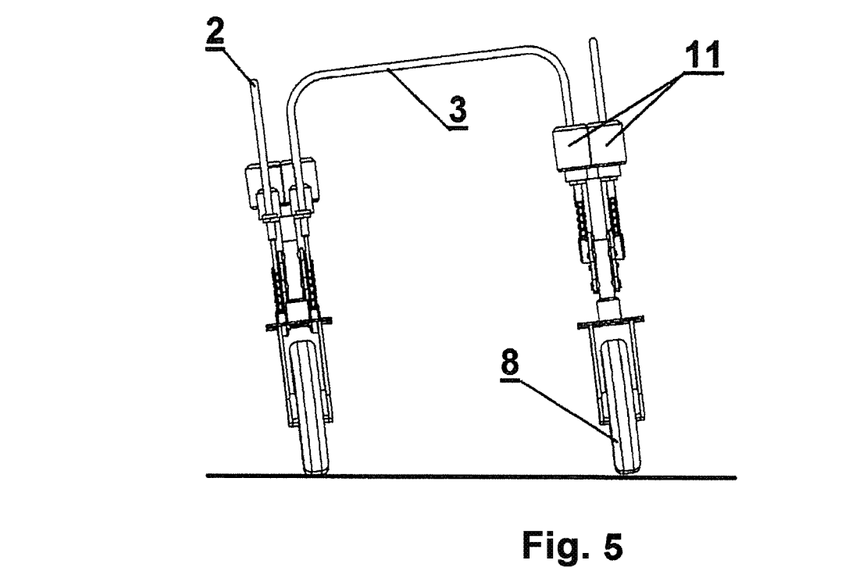
FIG. 5 schematically shows the process of tilting the suspension to the right (left)
Figure 6:
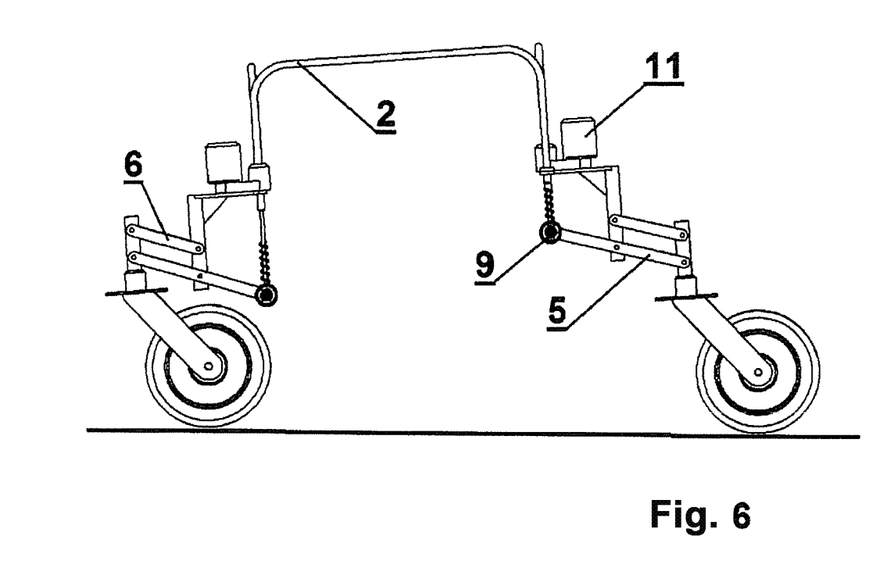
FIG. 6 schematically shows the process of tilting the suspension forwards (backwards)
Figure 7:
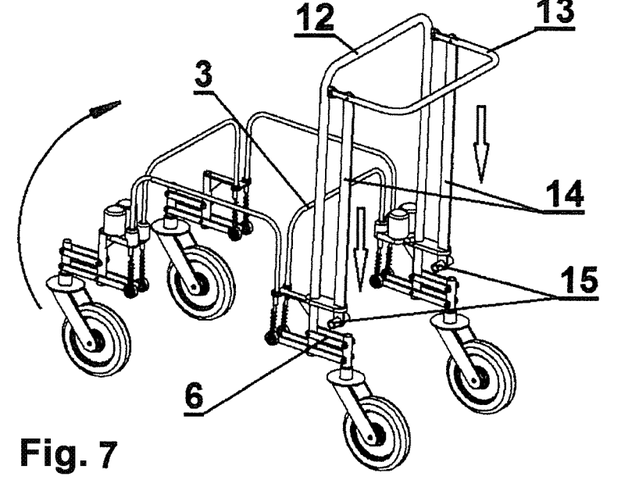
FIG. 7 shows an additional stabilization mechanism.
Figure 8:
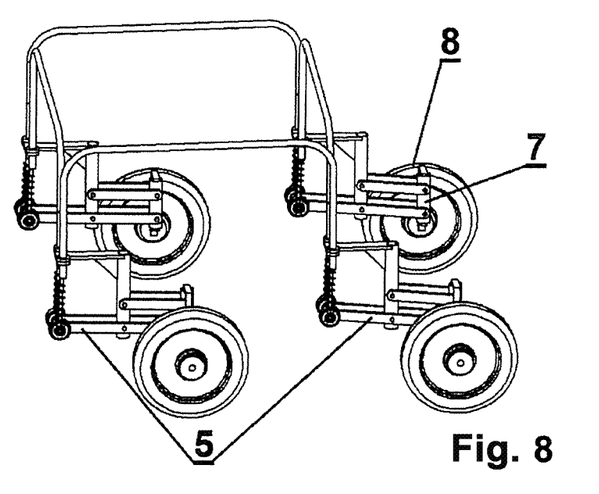
FIGS. 8, 9, 10 schematically show various orientations of wheel blocks.
Figure 9:
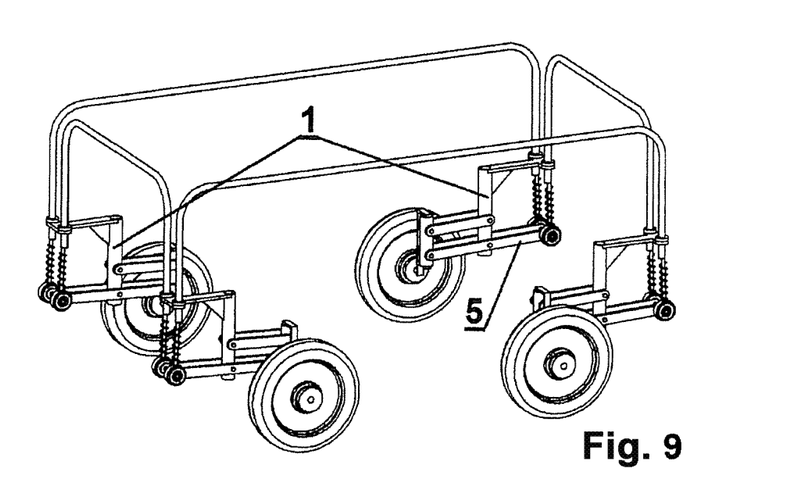
Figure 10:
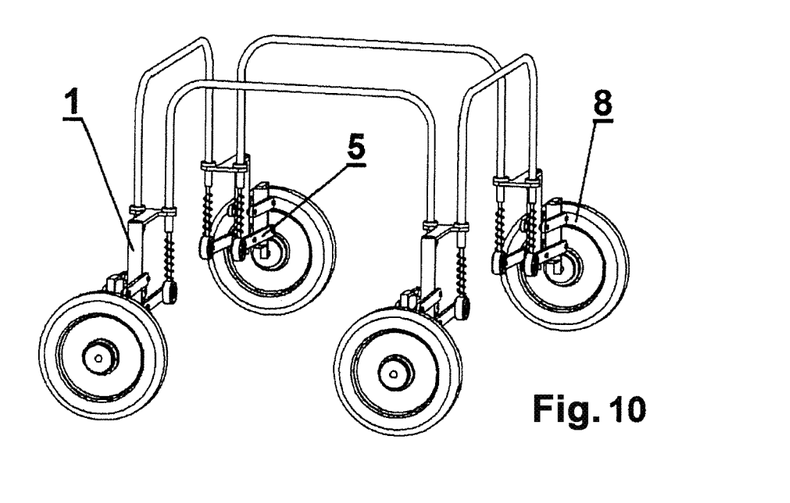
Figure 11:
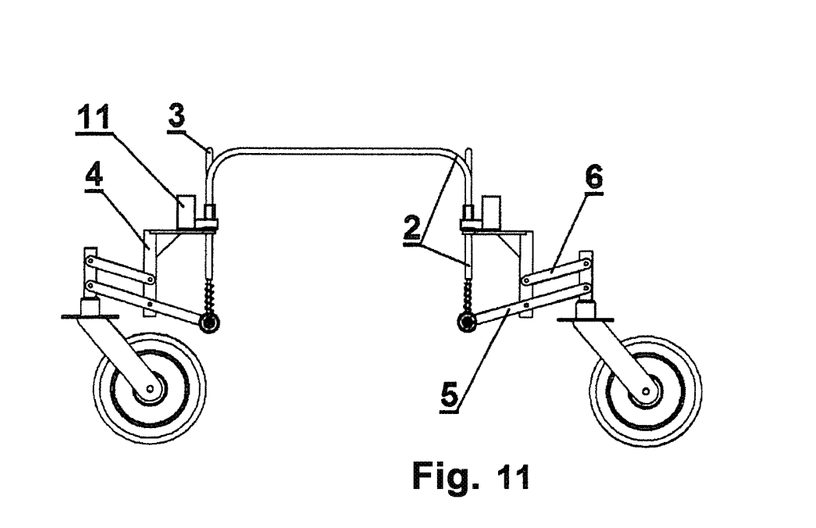
FIGS. 11, 12 schematically illustrate the process ground clearance changing.
Figure 12:
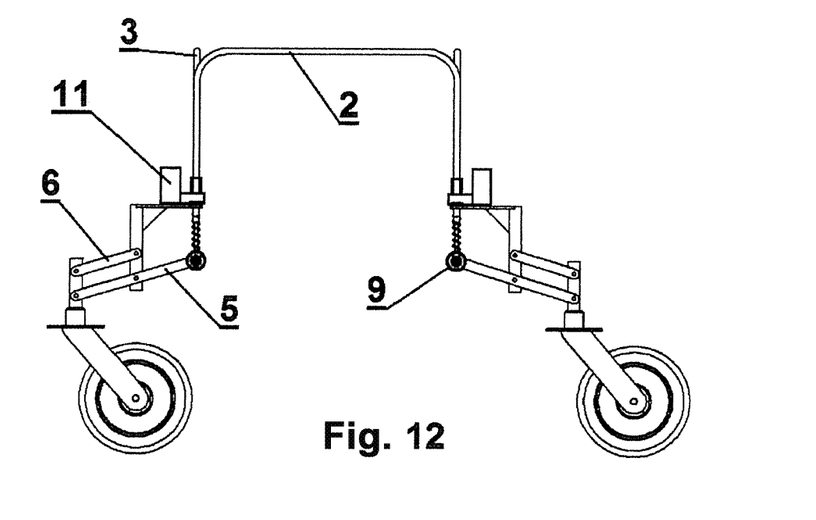

"AFW-4" vehicle suspension operates as follows. At the assembling stage, for proper operation of the suspension, the length of the coupling cables 2 and 3 should be set such that the arms 5 and 6 of the front and rear wheel blocks 1 occupy a horizontal position. Due to gravity the vehicle suspension self-aligns and evenly distributes its weight among four wheels 8 (four points of support). Arms 5 and 6 (FIGS. 4, 5, 6) may freely rotate during movement, when a wheel 8 of one wheel block encounters an obstacle. This causes a change of the length of the coupling cables 2 and 3 coupled with adjacent wheel blocks 1, and therefore a change in the position of their arms 5 and 6 and a change in the spatial position of the quadrangular frame (not shown), and as a result, under the influence of gravitational forces the vehicle suspension self-aligns and evenly distributes its weight among four wheels 8. In this case the quadrangular frame occupies the position of the averaged plane for four points where wheels 8 contact the road surface (ground). The suspension overcomes small obstacles due to using of dampers 9. By changing the length of the coupling cables 2, it is possible to tilt the vehicle frame to the right or left (FIG. 5) to ensure its steady movement along the slope, or for cornering, or to allow passengers to enter/leave the vehicle. The tilt of the vehicle body with the frame is attained through the use of the mechanism for changing the length, i.e. a linear actuator 11. For right tilt, the length of the housing of the cable 2 on the right is decreased with simultaneous increase of the length of the cable 3 housing on the left. Synchronous and identical change of the length of the cables 2 and 3 using linear actuators 11 causes a change in the positions of the arms 5 and 6 and the body 4 of the wheel block 1, which increases or decreases the ground clearance (FIGS. 11, 12). With unchanged length of the coupling cables 2, while synchronously changing the length of the coupling cables 3: by increasing the front one and decreasing the rear one, the suspension may be tilted forwards; by increasing the rear one and decreasing the front one, the suspension may be tilted backwards and thus pass over obstacles, e.g. a baby buggy can roll on a street curb only on a pair of rear wheels 8. For this purpose, a baby buggy user pushes down the handrail 13 pivotally connected to the U-shaped frame 12, thus lowering the rods 14 with the blockers 15 until they interact with the arms 6 of the wheel blocks 1. This leads to the fixation of the arms 5 and 6 in a parallel position and prevents suspension tilting when the front wheels 8 get off the road surface (ground). To increase ground clearance and height of obstacles to be passed over, the lengths of arms 5 and 6 may be increased. There are four possible options for the mutual orientation of the arms, which are suitable for various purposes (FIGS. 1, 8, 9, 10).

The following vehicles possessing high stability while passing over obstacles may be designed based on the "AFW-4" suspension:

- baby buggies and wheelchairs;
- hospital carts for patients (hospital wheelchairs) and beds with a function of adjustable height and lateral tilt for comfortable moving a patient or movement along a slope;
- assemblable and disassemblable or collapsible carts for transporting goods in retail stores and warehouses due to the use of cables 2, 3 in housings and linear actuators 11 in their structures;
- carts for transporting materials at construction sites;
- midget cars with both traditional internal combustion engines and electric motor drives. The use of "AFW-4" suspension in a passenger car allows significant savings in materials (up to 20% or more by weight) through the use of a flat supporting structure. It simply implements a mechanism of cornering with body tilting, like in case of a motorcycle;
- carts for video cameras, moon rovers, etc.;
- transport systems where the four wheel blocks are attached to a load acting as a frame;

The "AFW-4" suspension rests on all four wheels 8 simultaneously. It ensures a uniform and constant distribution of the weight, which is achieved without spring elements, but only due to a mechanical coupling of all wheels 8 with each other and due to the forces of gravity.

The suspension is fully operational when installed on all four wheels 8 of the same or different diameters and is not sensitive to wheel 8 punctures.

The list of items on the schematic drawings:
1—wheel block;
2—longitudinal coupling cable;
3—transverse coupling cable;
4—wheel block body;
5 and 6—arms;
7—wheel hub;
8—wheel;
9—damper;
10—spring stabilizer;
11—linear actuator;
12—U-shaped vertical frame;
13—handrail;
14—rod;
15—blocker preventing movement of the arms 5 and 6 of the wheel blocks 1.

While the present invention has been particularly described, in conjunction with one or more specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A vehicle suspension comprising a quadrangular frame with a wheel block kinematically attached to each corner section thereof, thus forming two pairs of wheels—front and rear ones, having respective longitudinal and transverse coupling cables in housings, respectively, are attached to the sides of the frame so that they can move along the sides of the frame, each wheel block consists of a body connected with two coupling cables simultaneously, parallel horizontal arms are movably mounted on said body, the first arm is attached to the body with its middle part, a knuckle with a wheel hub is attached to one end of the first arm and to one end of a second arm, two coupling cable dampers are attached to another end of the first arm, coupling cable housings are attached on the body of the corresponding wheel block, a free end of each cable is fixed in a respective damper, spring stabilizers of wheel position are put on end sections of cables protruding from the housings in front of the damper, and each coupling cable has a linear actuator, the casing of said linear actuator being rigidly attached to the body of the wheel block so that to allow changes in the relative position of the coupling cables housings and the body.

2. The vehicle suspension according to claim 1 wherein the suspension is supplemented with a U-shaped vertical frame, where its free ends are rigidly attached to the bodies of one pair of wheel blocks, while the U-shaped frame is pivotally connected to a handrail, kinematically coupled with blockers preventing wheel block arms movement.

\* \* \* \* \*